(12) United States Patent
Tsyplakov

(10) Patent No.: US 12,173,722 B2
(45) Date of Patent: Dec. 24, 2024

(54) TURBO COMPRESSOR ASSEMBLY OF A COOLING MACHINE

(71) Applicant: MIRAI INTEX SAGL, Chiasso (CH)

(72) Inventor: Vladyslav Tsyplakov, Versoix (CH)

(73) Assignee: MIRAI INTEX SAGL, Chiasso (CH)

(*) Notice: Subject to any disclaimer, the term of this patent is extended or adjusted under 35 U.S.C. 154(b) by 70 days.

(21) Appl. No.: 18/248,122

(22) PCT Filed: Sep. 10, 2021

(86) PCT No.: PCT/EP2021/074994
§ 371 (c)(1),
(2) Date: Apr. 6, 2023

(87) PCT Pub. No.: WO2022/073718
PCT Pub. Date: Apr. 14, 2022

(65) Prior Publication Data
US 2023/0407873 A1    Dec. 21, 2023

(30) Foreign Application Priority Data
Oct. 8, 2020   (CZ) ............................. CZ2020-548

(51) Int. Cl.
*F04D 29/051*    (2006.01)
*F04D 25/06*     (2006.01)
(Continued)

(52) U.S. Cl.
CPC ......... *F04D 29/0513* (2013.01); *F04D 25/06* (2013.01); *F04D 29/0516* (2013.01);
(Continued)

(58) Field of Classification Search
CPC .... F04D 25/06; F04D 29/0513; F04D 29/102; F04D 29/0516; F04D 29/284; F04D 29/582
See application file for complete search history.

(56) References Cited

U.S. PATENT DOCUMENTS

| 5,066,197 | A  |    | 11/1991 | Champagne |
| 7,322,207 | B2 | *  | 1/2008  | Kikuchi .............. F04D 29/058 |
|           |    |    |         | 62/401 |

(Continued)

FOREIGN PATENT DOCUMENTS

| CZ | 308332 B6   | 5/2020 |
| EP | 1 887 190 A2 | 2/2008 |

(Continued)

OTHER PUBLICATIONS

PCT Search Report. Dec. 17, 2021.
CZ Search Report, Nov. 30, 2020.

*Primary Examiner* — Nathan C Zollinger
(74) *Attorney, Agent, or Firm* — Dority & Manning, P.A.

(57) ABSTRACT

A turbo compressor assembly of a cooling machine has a shaft mounted in a common housing with first and second radial dynamic gas bearings and a thrust bearing. A supply stream of working gas supplied to the first radial bearing is formed between an inner wall of a compressor body and the shaft, and a supply stream of working gas from a turbo expander supplied to the second radial bearing and to the thrust bearing is formed between an inner wall of a turbo-expander body and the shaft. The first radial dynamic gas bearing is sealed towards the electric motor rotor by a shaft seal. A surface in a shape of an annulus is formed on the shaft between the first radial bearing and the shaft seal, the annulus perpendicular to an axis of the shaft and functioning as a piston for balancing an axial force acting on the shaft.

6 Claims, 3 Drawing Sheets

(51) Int. Cl.
  *F04D 29/10*  (2006.01)
  *F04D 29/28*  (2006.01)
  *F04D 29/58*  (2006.01)

(52) U.S. Cl.
  CPC ......... *F04D 29/102* (2013.01); *F04D 29/284* (2013.01); *F04D 29/582* (2013.01)

(56) References Cited

U.S. PATENT DOCUMENTS

| | | | | |
|---|---|---|---|---|
| 8,347,648 | B2* | 1/2013 | Nakazeki | F16C 19/54 417/407 |
| 8,397,506 | B1* | 3/2013 | Wright | F02C 1/10 415/110 |
| 10,808,757 | B2* | 10/2020 | Ryu | F16C 29/025 |
| 11,598,221 | B1* | 3/2023 | Shinoda | F04D 29/584 |
| 2009/0015012 | A1* | 1/2009 | Metzler | F04D 29/058 415/173.1 |
| 2019/0170190 | A1 | 6/2019 | Ryu | |
| 2019/0293117 | A1 | 9/2019 | Ertas et al. | |
| 2020/0256344 | A1 | 8/2020 | Sakota et al. | |
| 2020/0263698 | A1* | 8/2020 | Mori | F04D 25/024 |

FOREIGN PATENT DOCUMENTS

| WO | WO 2010/151138 A1 | 12/2010 |
|---|---|---|
| WO | WO 2019/082642 A1 | 5/2019 |

* cited by examiner

TURBO COMPRESSOR ASSEMBLY OF A COOLING MACHINE

TECHNICAL FIELD

The invention relates to a turbo compressor assembly of a cooling machine comprising a compressor, an electric motor and a turboexpander which are arranged in a common housing which comprises a compressor body, an electric motor body, a turboexpander body and a shaft mounted in the common housing in gas bearings into which opens the supply of working gas from the turbo compressor assembly, wherein an impeller of the compressor, an impeller of a turbine of the turboexpander and the rotor of the electric motor are fixedly mounted on the shaft, wherein the compressor impeller and the turbine impeller are placed at opposite ends of the common shaft and the rotor of the electric motor is placed between them.

BACKGROUND ART

Industrial cooling machines, which have an output in the order of tens of kW to units of MW, usually consist of a compressor, an electric motor and an expansion turbine, wherein air or another cooling medium is first compressed by a compressor which is driven by an electric motor, then the cooling medium is fed to a turbine in which it expands and is cooled, wherein the energy that the compressed medium transfers to the reaction turbine as it expands is used to drive the compressor, thus reducing the energy consumption of the cooling machine. The cool air from the turbine is then heated in an exchanger or in a cooling chamber which it cools and is fed back to the compressor inlet. This type of a cooling machine is disclosed, for example, in patent CZ308332B6.

As demands for energy efficiency, ease of maintenance and reliability of cooling machines have been increasing recently, machines where a refrigeration system comprises a compressor, a motor and an expansion turbine mounted on a common shaft in a common housing are becoming increasingly common. The shaft of such a cooling machine is usually housed inside the housing in two radial and one thrust bearing, whereby the radial bearings support the rotating shaft and damp its vibrations, while the thrust bearing fixes the shaft relative to the machine body, damps shaft impacts caused by changes in axial force acting on the shaft of the rotary machine, and provides one fixed point of the shaft relative to the machine body during the relative axial displacement of the shaft parts towards the housing parts caused by axial force and different thermal expansion of different machine parts, especially when putting the machine into operation or out of operation.

For the purposes described above, some of the commonly available types of bearings have previously been used, such as rolling, sliding, hydrodynamic or aerostatic bearings. However, the use of these types of bearings has various disadvantages. Patent U.S. Pat. No. 8,347,648B2 discloses a turbine for use in a cooling cycle, which in a common turbine body comprises a single-wheel compressor attached to a common shaft, a single-wheel expansion turbine, an electric motor, a thrust magnetic bearing, radial rolling-contact bearings, wherein the compressor wheel and the turbine wheel are overhanging at opposite ends of the common shaft. Such a design of the turbine for producing cold has the disadvantage that the rolling contact bearings do not allow to operate the machine at energy-efficient high revolutions.

The use of hydrodynamic bearings for rotary machines, which is known from steam turbines, is not suitable for the above-described cooling turbo compressors, because hydrodynamic bearings require the installation of a separate oil system and its sealing from the machine parts through which flows the working cooling medium, usually air or other gas, which is difficult to secure with the bearings placed inside the common housing of the machine and, as a result, the entire machine would be disproportionately expensive. Similarly, the use of fluid static bearings which utilize pressurized gas or fluid as a medium requires a separate system for supplying the high-pressure medium, for example a high-pressure hydraulic system, which is pressurized and driven by an external energy source, increases the cost and reduces the reliability of the machine.

The above-mentioned shortcomings of conventional bearings have led some refrigeration machine manufacturers to use both thrust and radial magnetic bearings. Patent U.S. Pat. No. 7,322,207B2 discloses an air refrigerant cooling apparatus which comprises a single-wheel compressor, which is mounted in a common housing on a common shaft, a single-wheel expansion turbine, an electric motor, an axial magnetic bearing, two radial magnetic bearings, wherein the compressor wheel and the turbine wheel are overhanging at opposite ends of the common shaft. The stator and rotor of the electric motor of the machine are cooled by cooling air, which circulates within a separate cooling system, separately from the working gas of the cooling apparatus. The leaks of the working medium are sucked out through separate vents, separately to one outlet pipe for leaks from the compressor and separately to the other vent for leaks from the turbine, whereby the leaked working medium does not pass through the rotor of the electric motor. The functionality of magnetic bearings depends on the supply of electricity, the source of electricity must be backed up to prevent a major accident on the apparatus in the event of a sudden power failure. Another significant disadvantage of magnetic bearings is their low stiffness, which does not guarantee sufficient damping of vibrations that occur when the machine is put into operation or out of operation and during its transition through the critical revolutions, which at the revolutions corresponding to the frequency that is a multiple of the natural frequency of the machine, causes undesired vibrations of the machine. If magnetic bearings are to be used for a larger, more powerful machine, it is necessary to back them up with additional sliding bearings for the above reason of their low stiffness. However, the addition of sliding bearings to the common machine housing extends the machine axial length and increases its manufacturing costs. Furthermore, it extends the length of the shaft between bearings and possibly the length of the overhanging ends of the shaft behind the bearings. Also, it adversely affects the dynamics of the machine shaft.

Document US2019170190A1 discloses a rotor system including a rotating shaft, wherein a first rotating impeller, a first thrust air bearing, a thrust disc, a second thrust air bearing, a first journal air bearing, a stator for providing a rotating force to the rotating shaft structure, a second journal air bearing and a second rotating impeller which is heavier than the first rotating impeller are disposed in the axial direction of the shaft. A temperature of air flowing to the second rotating impeller is higher than that of air flowing to the first rotating impeller. Such arrangement of the rotor system could minimize a thermal deformation of the disc, which is advantageous in applications with high temperatures of the working air/gas, e.g. in turbo chargers, combustion gas turbines, etc. Such arrangement of the rotor system does not solve a problem of relative axial displacement of a shaft of turbo compressor for cooling machines. Another disadvantage of the system known from US2019170190A1 is that a difference of thrust generated by the two wheels is compensated only via the thrust bearings, and therefore the system cannot be used for machines with bigger difference of the thrust.

Document WO2010151138A1 describes an axial gas thrust bearing for rotors in rotating machinery which comprises at least one radial disk, integral with or fastened to the rotor and one fixed seal facing each disk or two fixed seals positioned to surround each disk, lower portions of the seals being situated in distance from the rotor to allow the inflow of compressed fluid passing in the gap between the respective disk and seals. The disadvantage of the disc is that the inflow of compressed fluid is axially entering the gap from both sides of the disc, and therefore a colder fluid entering the disc from one side cannot be used for cooling the shaft on the opposite side of the disc. Another disadvantage of the thrust bearing according to WO2010151138A1 is that there are no means for limitation of thermal convection of heat between the disc and adjacent shaft and/or adjacent components mounted on the shaft, e.g., a turbine wheel.

PRINCIPLE OF THE INVENTION

An objective of the present invention is therefore to remove or reduce the above-mentioned drawbacks of well-known technical solutions by a turbo compressor assembly for cooling machines which comprises dynamic gas bearings which use the working gas of the cooling machine. Additional objects and advantages of the invention will be set forth in part in the following description, or may be obvious from the description, or may be learned through practice of the invention.

The objectives of the invention are achieved by a combined turbo compressor assembly of a cooling machine comprising three machines: a compressor, an electric motor, and a turboexpander, which are arranged in a common housing of the turbo compressor assembly in which a common shaft is mounted.

The shaft is mounted in the common housing (in the body of the assembly) in two radial dynamic gas bearings and in one thrust dynamic gas bearing. The working gas supply from the turbo compressor assembly opens into these bearings. The advantages of dynamic gas bearings, compared to other types of bearings, e.g., magnetic, rolling, sliding, hydrodynamic or aerostatic bearings, include their small installation size, which shortens the axial length of the assembly, sufficient stiffness to dampen unwanted vibrations of the assembly, absence of the need for an external source of energy, whether electricity or pressure, high operational reliability, low requirements for maintenance and throughput for the working gas of the cooling device. The throughput rate of the working gas of the cooling device along the entire shaft of the turbo compressor assembly, including the throughput through the bearings, enables to utilize the working gas to cool the shaft and balance the axial force of the turbine of the compressor.

The first radial dynamic gas bearing, in which the assembly shaft is mounted, is arranged in the assembly housing between a diffuser of the compressor and the stator of the electric motor, the shaft being mounted in the first radial bearing between an impeller of the compressor and the rotor of the electric motor. The second radial dynamic gas bearing is mounted in the assembly housing between a spiral chamber of the gas inlet to the turboexpander and the stator of the electric motor, the shaft being mounted in the second radial bearing between an impeller of the turbine of the turboexpander and the rotor of the electric motor. The thrust dynamic gas bearing, in which the assembly shaft is mounted, is arranged in the assembly housing between the spiral chamber of the gas inlet to the turboexpander and the second radial dynamic gas bearing, wherein a disk of the bearing, which is part of the shaft, is mounted in the thrust bearing between the impeller of the turbine of the turboexpander and the second radial bearing. Between the inner wall of the compressor body and the shaft, a supply of a secondary stream of working gas to the turbo compressor assembly to the first radial bearing is formed, and between the inner wall of the turboexpander body and the shaft, a supply of a secondary stream of working gas to the second radial bearing and to the thrust bearing is formed.

Locating the radial bearings as close as possible to the impellers of the compressor and of the turbine of the turboexpander is advantageous in damping unwanted vibrations of the common shaft of the assembly, which occur while the machine is put into operation or out of operation when the machine passes through its critical revolutions, when the rotational frequency of the machine is a multiple of the natural frequency of the common shaft.

The assembly of a turbo compressor for a cooling machine according to the invention operates, under full operation, with a temperature difference of up to 300° C., when the gas temperature at the outlet of the turboexpander diffuser drops to a temperature of minus 150° C. and the temperature of the compressed air in the compressor diffuser reaches a temperature of plus 150° C. The thrust bearing is in the axial direction a stable point of mutual position of the shaft and the assembly body. Positioning the thrust bearing as close as possible to the cold side of the assembly where the material expands the least, and correspondingly locating the disk of the thrust bearing on the shaft as close as possible to the impeller of the turbine of the turboexpander is advantageous from the point of view of designing the mutual position of the individual parts of the assembly housing and of the shaft of the assembly and the clearance between them, which must take into account the different thermal expansion of the individual parts of the assembly during the machine operation at varying temperatures and fluctuating temperature gradients.

Another advantage of locating the thrust bearing on the cold side of the assembly near the impeller of the turbine of the turbo compressor is that relatively cold air from the turboexpander, which has a higher density than relatively warmer air from other parts of the turbo compressor assembly, is used as the working gas of the gas dynamic thrust bearing. The use of cooler, more dense gas contributes to greater stiffness and better operational reliability of the thrust dynamic gas bearing.

The rotating impeller of the compressor, which draws in gas in substantially axial direction and expels gas into a diffuser of the compressor in substantially radial direction, is acted upon by the compressed gas by a reactive force, the axial component of which acts on the common shaft of the assembly in the direction of the axis of the shaft against the direction of the flow of the working gas to the confuser of the compressor. Such axial force and its sudden changes can damage the thrust bearing and cause the seizing of the machine. To balance this unwanted axial force, a piston that is formed on the shaft is used. The pressure of the working gas acts on the surface of the piston which is perpendicular to the axis of the shaft, by axial force which compensates for the undesired axial force caused by the pressure of the gas on the compressor impeller. The piston is preferably located between the first radial bearing and the rotor of the electric motor, so that the advantageous position of the first radial bearing as close as possible to the impeller of the compressor can be maintained. The advantage of the radial dynamic gas bearing is the fact that the working gas, which exerts pressure on the piston, can pass freely through this bearing and need not be supplied to the piston by other means. The space between the shaft and the housing, which is located between the piston and the rotor of the electric motor, is sealed by a shaft seal which restricts the passage of the working gas stream further towards the rotor of the electric motor and maintains a sufficiently high gas pressure in the piston space to exert a sufficiently large force on the piston.

In the present invention of the turbo compressor assembly for a cooling machine, a labyrinth seal of the so-called false labyrinth type is used to seal the space behind the piston for balancing the axial force, where several radially arranged teeth in a row seal against an essentially smooth opposite surface. In order to effectively seal and achieve a greater pressure drop, as well as the associated minimum leaks of the working medium and the associated higher efficiency of the cooling machine, it is advisable to use at least 5 sealing teeth against the opposite substantially smooth cylindrical surface.

The seal of the so-called false labyrinth type, when one of the sealing cylindrical surfaces is substantially smooth, is preferably used in this invention to facilitate the assembly of the pot-type body of the assembly. In the pot arrangement of the body/housing of the assembly, the individual parts of the assembly, including the shaft, are inserted into the housing/body of the assembly, which has the shape of a pot and is composed of sub-bodies which also have the shape of a pot or of a substantially hollow cylinder, and are connected to one another and sealed. Such a turbo compressor housing/body has no joint in a parting plane parallel to the axis of the rotary machine. The assembly which during operation has a high temperature difference in the various axially arranged parts of the assembly and is heated/cooled by the working medium which is fed/discharged to/from the machine in substantially radial direction, has a relatively high temperature difference also between the top and bottom parts of the machine, different temperature deformation of the top and bottom parts of the machine occurs, and if the joint of the body parts is parallel to the axis of the assembly, this joint is deformed and loses tightness.

In order to achieve a sufficiently small radial clearance between the sealing blades and the opposite substantially cylindrical sealing surface and to achieve a sufficient tightness of the above-described shaft seal without the need to use more than 10 sealing teeth, which would undesirably extend the axial length of the shaft and the entire machine, it is advantageous if the cylindrical sealing surface is part of the part of the assembly housing which at the same time serves as a carrier of the radial dynamic gas bearing. The design of the bearing carrier integrated with the housing part, which forms the surface which is part of the shaft seal, and with the part, which forms the surface which lies against the piston and connects the bearing carrier and the seal part, reduces the number of body parts that would otherwise be manufactured individually and would also be mounted individually to the machine body. This not only saves time, but in particular also reduces assembly tolerances, so that a smaller sealing gap between the teeth of the labyrinth seal and the opposite sealing surface can be obtained with greater accuracy. In this preferred embodiment, the first radial gas bearing is mounted in the carrier, which comprises a first inner cylindrical surface for mounting a casing of the bearing and a second inner cylindrical surface, which is part of the shaft seal. Both these cylindrical surfaces are substantially parallel to the axis of the shaft, and the carrier also comprises a third surface in the shape of an annulus, which is located between the two above-described cylindrical surfaces and is substantially perpendicular to the two surfaces and when assembled, it is located against the piston.

In the above-described preferred embodiment of the radial bearing carrier integrated with the seal, the bearing carrier constitutes a common part of the compressor housing and the electric motor housing such that the carrier partially extends into the compressor housing where the radial dynamic gas bearing is mounted and partially extends into the electric motor housing where it is part of the seal. In the part extending into the compressor housing, the carrier is surrounded by the compressor body in which it is housed, in the part extending into the electric motor housing, the carrier is surrounded by the inner body of the electric motor in which it is housed.

The disk of the thrust dynamic gas bearing is fixedly mounted on the shaft between the part of the shaft mounted in the second thrust dynamic gas bearing and the blade impeller of the turbine of the turboexpander. The disk of the thrust dynamic gas bearing comprises a first substantially flat side of the disk which is axially oriented towards the rotor of the electric motor and a second substantially flat side of the disk which is axially opposite to the first side of the disk in the shaft axis. The first side of the disk abuts the shaft to which the disk is fixedly connected, e.g., in such a manner that the first side of the disk comprises a protrusion which is inserted into a cavity formed in the shaft and/or the disk is fixed to the shaft by a screw and the disk and shaft are secured against mutual rotation in the radial direction by screws or pins which are fixed in the holes in the disk and in the shaft. The impeller of the turboexpander turbine abuts with the side which is axially opposite to the side on which the impeller blades are located and which is substantially flat, to the substantially flat second side of the disk and is firmly connected to it, e.g., in such a manner that one of the adjacent sides comprises a protrusion which is inserted into the opposite part and/or in such a manner that the impeller is fixed to the disk by a screw and the impeller and the disk are secured against mutual rotation in the radial direction by screws or pins that are housed in the holes in the disk and in the shaft. An axial gap in the form of a radial groove formed on the shaft surface between the disk and the turboexpander impeller is preferably formed between the second side of the disk and the impeller side of the turboexpander turbine associated therewith. This axial gap reduces the contact area between the disk and the relatively cold turboexpander impeller and thus partially interrupts the thermal bridge through which heat is transferred from the hot rotor of the electric motor to the cold impeller of the turboexpander via the common shaft. Another advantage of the technical solution described above, where the disk of the thrust bearing and the shaft of the assembly are not made of one piece of material, but are joined together in the manner described above, is the use of a thinner shaft in the part of the radial bearing and the associated saving of the material of the shaft and the body of the turboexpander in which it is mounted. For the mounting of the shaft in a pot body without a horizontal parting plane, a shaft is used which, in the part which is mounted in the radial dynamic gas bearing which is accommodated in the turboexpander body and which is arranged between the rotor of the electric motor and the impeller of the turboexpander, has a smaller diameter than the shaft on which the rotor of the electric motor is mounted. During assembly, the shaft passes through a part accommodated in the radial bearing through the inner cavity of the cylindrical body of the turboexpander, or through the inner cavity of the cylindrical body of the bearing carrier, which is accommodated in the turboexpander body, and the thrust bearing disk is attached to the shaft. The part of the shaft on which the rotor of the electric motor is mounted and which has a diameter larger than the part of the shaft mounted in the radial bearing, is not during mounting inserted through the cylindrical body of the turboexpander.

The stator of the electric motor is heated up undesirably during operation of the assembly and it is advantageous if it is cooled by a cooling medium which is different from the working gas of the cooling machine, whose leaks flow through the rotor of the electric motor, but which does not have sufficient flow rate or a sufficiently low temperature in the inner part of the electric motor to sufficiently cool the entire electric motor. In a preferred embodiment of the turbo compressor assembly of a cooling machine, the body of the electric motor comprises an inner body in which the stator of the electric motor is accommodated, and an outer body in which the inner body of the electric motor is accommodated. The inner and the outer bodies are bodies of the pot type described above, the inner body being inserted into the outer body, which surrounds it radially completely and axially at least partially. For efficient flow of the cooling medium in the vicinity of the stator of the electric motor, a common channel for the flow of the cooling medium of the electric motor is formed in the inner and outer bodies. The embodiment of the cooling channel uses a pot arrangement of the electric motor bodies and the channel is preferably formed in the electric motor body in such a manner that its part passing through the inner body is formed as at least one helix-shaped groove on the outer surface of the inner body and is enclosed along its entire length by the adjacent outer body, except for the two passages into the outer body, through which the medium flows in and out of the groove.

The turbo compressor assembly according to the present invention is suitable for using in known cooling machines, for example in the cooling machine according to patent CZ308332B6 and is particularly suitable for the industrial production of cold.

DESCRIPTION OF DRAWINGS

The present invention will be explained with reference to an exemplary embodiment of a turbo compressor assembly of a cooling machine, which is schematically represented in the drawings, wherein.

DETAILED DESCRIPTION

Figure 1:
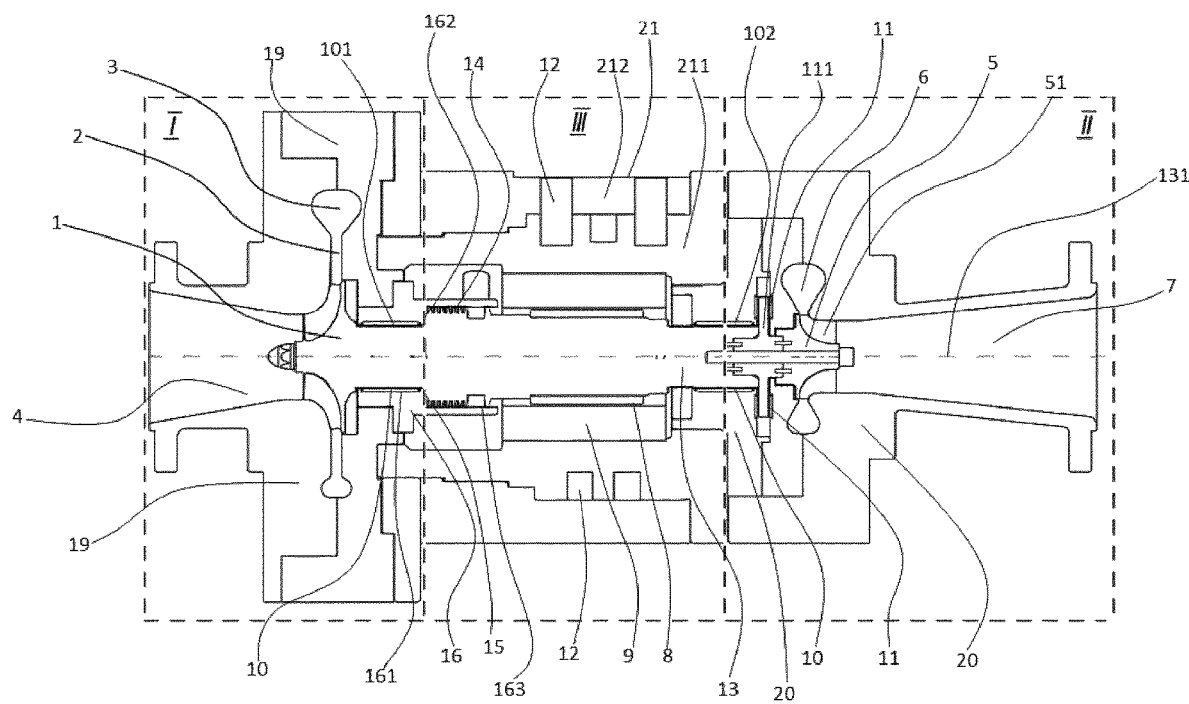
FIG. 1 shows an axial cross-section through a turbo compressor assembly indicating the components essential to explaining the principle of the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

A turbo compressor assembly for producing cold for a cooling device (FIG. 1, FIG. 2) comprises a compressor I, a turboexpander II, and an electric motor III which is arranged between the compressor I and the turboexpander II. The turbo compressor assembly comprises a common assembly housing which includes a body 19 of the compressor I, a body 20 of the turboexpander II, a body 21 of the electric motor III, and a shaft 13 which is common to the compressor I, the turboexpander II and the electric motor III. A radial blade impeller 1 of the compressor I, the rotor 8 of the electric motor with permanent magnets, and a radial blade impeller 5 of the turboexpander II are arranged on the common shaft 13 of the compressor in an axis 131, which is at the same time the axis of the assembly. The rotor 8 of the electric motor III is arranged between the impeller 1 of the compressor I and the impeller 5 of the turboexpander II, which are attached to opposite ends of the shaft 13, for example in the illustrated embodiment they are attached to the shaft faces. The shaft 13 is mounted in the common housing of the turbo assembly in two radial dynamic gas bearings 10, 101, 102 and in one thrust dynamic gas bearing 11.

Figure 2:
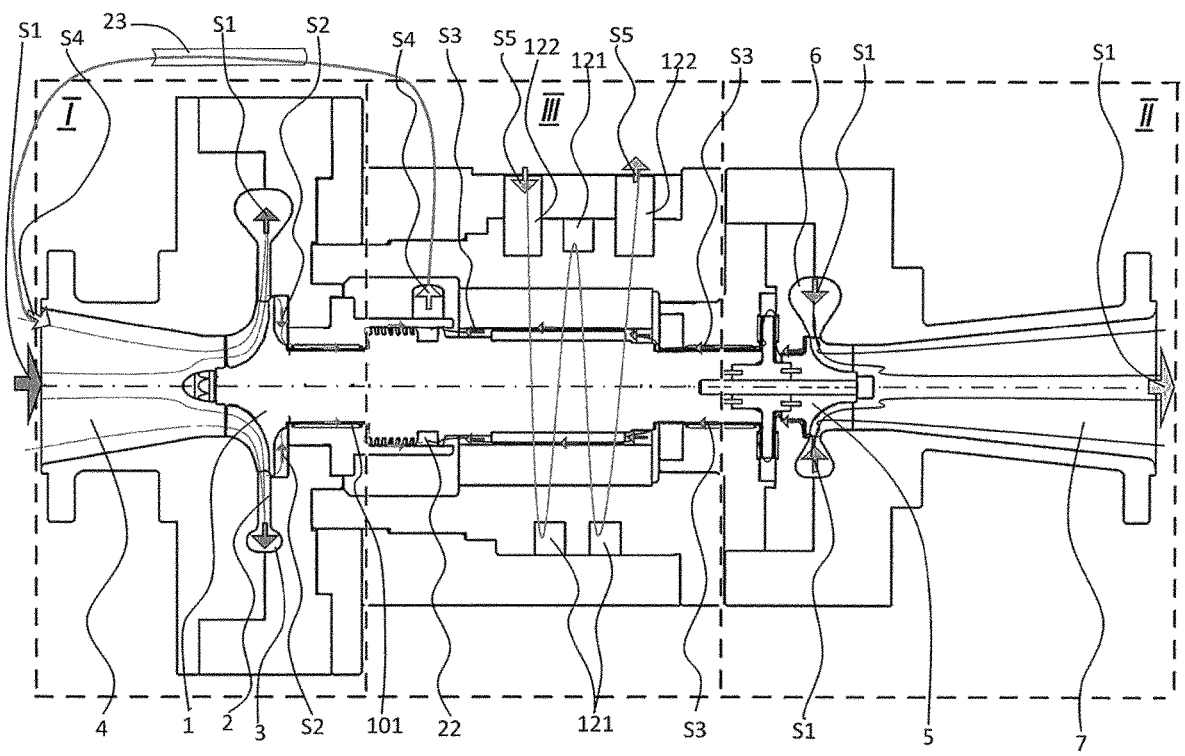
FIG. 2 shows an axial cross-section through the turbo compressor assembly shown in FIG. 1 indicating the flow of the medium of the cooling machine through the turbo compressor assembly.

The motor of the assembly, which, in the embodiment of the invention shown in FIGS. 1 and 2, is a synchronous electric motor III connected to a known unillustrated control unit, but any other type of motor can be used in other embodiments of the invention, e.g., an asynchronous electric motor. The motor of the assembly comprises the rotor 8 of the electric motor III mounted on the common shaft 13 of the assembly, the stator 9, and a body 21 which comprises an inner body 211 and an outer body 212. The stator 9 is accommodated in the inner body 211, and the inner body 211 is accommodated in the outer body 212 in such a manner that the outer body 212 is mounted on the outer cylindrical surface of the inner body 211. Thus, the inner cylindrical body 211 is inserted in the pot of the outer cylindrical body 212 and the outer body 212 is in the axial direction partially surrounded by the inner body 211. The inner and outer bodies 211, 212 of the electric motor III comprise a channel 12 for the flow of the stream S5 of the cooling medium for cooling the stator 9 of the electric motor III. The cooling channel 12 comprises an inner cooling channel 121 formed in the inner body 211 and an outer cooling channel 122 formed in the outer body 212. In this embodiment of the invention, the inner cooling channel 122 is designed in such a manner that a helix-shaped groove 121 of the inner body 211 is milled on the outer cylindrical surface of the inner body 211, the groove 121 being covered in the assembled state of the body 21 of the electric motor III by the inner cylindrical surface of the outer body 212. The outer cooling channel 122 is designed in the outer body 212 in such a manner that it passes through the outer body 212 at two locations and connects the inner cylindrical surface of the outer body 212 to the outer cylindrical surface of the outer body 211, thus connecting the inner cooling channel 121 to a supply/discharge pipe (not shown) of the cooling medium of the stator of the electric motor. The stream of the cooling medium S5 (FIG. 2), such as gas or fluid, flows through the first of the outer channels 122 inside the stator 9 of the electric motor III and is discharged through the second of the outer channels 122 out of the stator 9.

The compressor I (FIGS. 1, 2) comprises a confuser 4 at the inlet to the compressor I. The radial blade impeller 1 is mounted on the common shaft 13 of the assembly and the body 19 of the compressor I. In the body 19, a diffuser 2 is formed, to which a spiral outlet chamber 3 is connected.

The first radial bearing 101, which in this embodiment of the invention is a dynamic gas bearing, e.g., a foil bearing with a bent foil or another known dynamic gas bearing, is mounted in a carrier 16, which is partially surrounded by the body 19 of the compressor I and partially extends into the electric motor III and is surrounded by the inner body 211 of the electric motor III. The carrier 16 of the first radial bearing 101 comprises three inner surfaces. The first inner cylindrical surface 161 of the carrier 16 is substantially parallel to the cylindrical surface of the shaft 13, and thus to the axis 131 of the shaft 13, and the first radial bearing 101 is arranged thereon. The casing of the first radial bearing 101 is inserted into this part of the carrier 16. The second inner cylindrical surface 163 is, just as the first inner cylindrical surface 161, substantially parallel to the axis of the shaft 131. The second cylindrical surface 163 has an inner diameter greater than the first cylindrical surface 161 and is part of the shaft seal 14. In the assembled state of the assembly, the first cylindrical surface 161 of the carrier 16 of the bearing 101 is located between the second inner cylindrical surface 163 and the impeller 1 of the compressor I. Between the first inner cylindrical surface 161 and the second inner cylindrical surface 163 of the carrier 16 is in the shape of an annulus situated a third inner surface 162, which is substantially perpendicular to the axis of the shaft 131 and in the assembled assembly it is placed in the axial direction against the piston 15, which is formed on the shaft 13 and serves to balance the axial force by which the impeller 1 of the compressor I acts on the common shaft 13 of the assembly.

In an exemplary embodiment of the invention, the shaft seal 14 is a false labyrinth seal, in which on the cylindrical surface of the shaft 13, 7 to 9 circular sealing teeth are arranged perpendicular to the shaft axis 131. The circular sealing teeth seal against the substantially flat second inner surface 163 of the carrier 16 which they do not touch. The number of sealing teeth depends on the pressure of the working medium before entering the seal 14 and on the required pressure drop of the seal 14, the optimum number of the teeth is in the range of 5 to 10 teeth, depending on the characteristics of the cooling machine for which the turbo compressor is used.

A common suction channel 22 is arranged downstream of the shaft seal 14 in a direction towards the rotor 8 of the electric motor III in the inner body 211 of the electric motor III, by which leaks of the gaseous working medium are sucked out, e.g., air, which passes from the compressor I through the shaft seal 14, as well as the leaks of the working medium which pass from the turbine of the turboexpander II through the electric motor III. Leaks of the working medium are discharged from the common suction channel 22 through the pipe 23 (FIG. 2) to the confuser 4 at the inlet to the compressor I.

In this embodiment, the teeth of the shaft seal 14 are fixedly mounted on the rotating shaft 13 of the assembly and, in the assembled state of the assembly, are positioned opposite the second inner surface 163 of the bearing carrier 16, which is a non-movable part of the assembly housing. The teeth of the seal 14 are in this embodiment milled directly into the material of the shaft 13, but in another embodiment, strips of sheet caulked in the grooves can be used instead of milled teeth. In another embodiment of the seal 14, the surface 163 is provided with a sprayed material that is softer than the material of the carrier 16, and/or with a metal felt in which the teeth of the labyrinth constitute sealing grooves during the machine operation. In another embodiment of the seal 14, a labyrinth seal is used with blades on the second inner surface 163 of the carrier 16, which seals against the substantially smooth cylindrical surface of the shaft 13. In yet other embodiments of the seal 14, other known types of suitable seals are used, e.g., brush seals or leaf seals, or combinations of these types of seals with the labyrinth seal described above.

The turboexpander II comprises a blade impeller 5 of an expansion turbine of the turboexpander II, which is attached to the common shaft 13 of the assembly, and a body 20 of the turboexpander II, in which an inlet spiral chamber 6 and an outlet diffuser 7 are formed. In the body 20, a second radial dynamic gas bearing 102 and a thrust dynamic gas bearing 11 are mounted, e.g., foil bearings with bent foil or other known suitable dynamic gas bearings.

Figure 3:
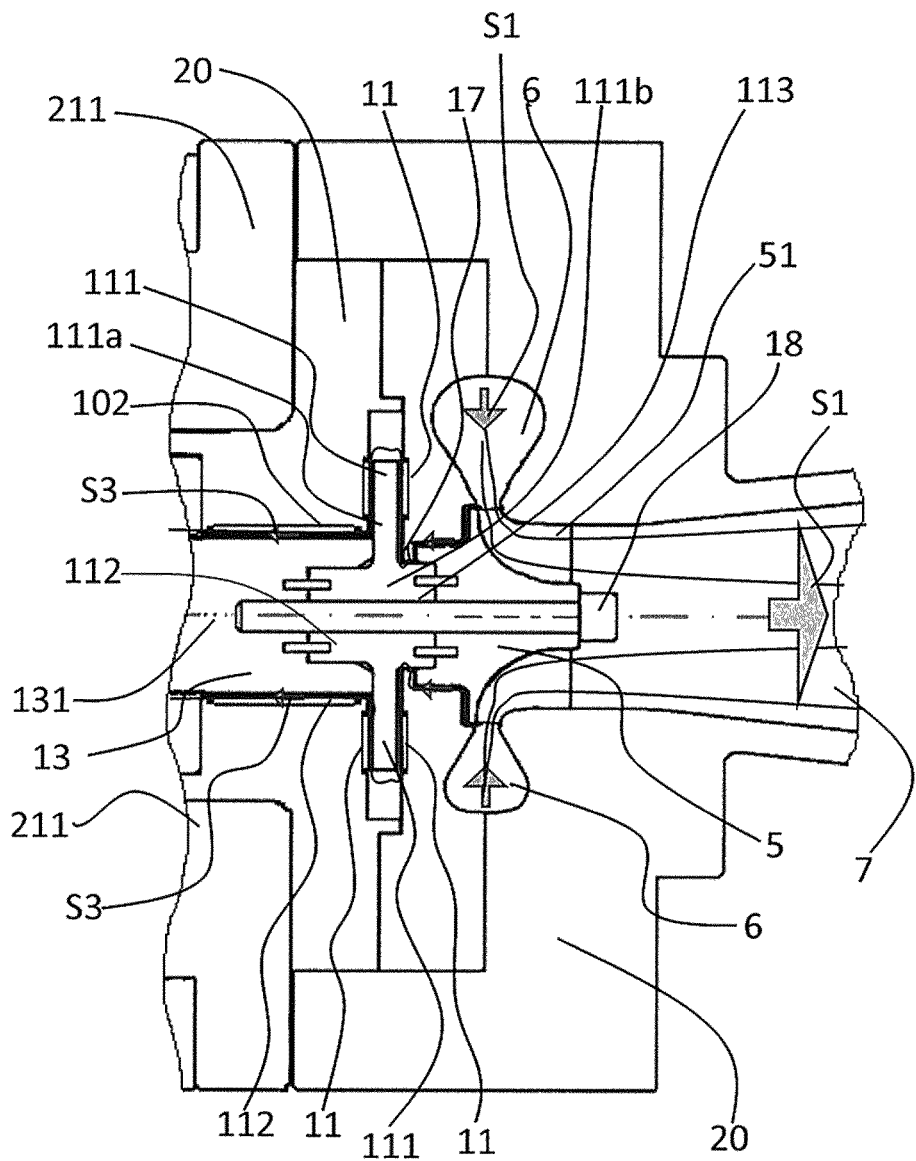
FIG. 3 schematically shows a detail of an embodiment of a part of a turboexpander.

In this embodiment of a turbo compressor assembly, the thrust bearing 11 is mounted between the second radial bearing 102 and the blade impeller 5 of the turbine of the turboexpander II, being situated in a relatively cool part of the shaft 13 of the turbo compressor assembly. In another embodiment, the second radial bearing 102 may be mounted between the thrust bearing 11 and the blade impeller 5. The thrust bearing 11 constitutes a stable point at which the shaft 13 is secured in the axial direction against displacement in the housing of the assembly. The disk 111 of the thrust bearing 11 comprises a first side of the disk and a second side of the disk, which together delimit the body of the disk 111 fixedly mounted on the shaft 13. The disk 111 attached to the shaft 13 is oriented such that the first side of the disk is located closer to the rotor 8 on the shaft 13 than the second disc side 111. The first and second sides of the disk 111 have a substantially circular shape. The disk 111 (FIG. 3) further comprises an inner part 111*b*, which is substantially concentric with the axis 131 and serves mainly to fix the disk 111 to the shaft 13, and an outer part 111*a*, which surrounds the inner part 111*b* in the radial direction and is mounted in the thrust bearing 11. Arranged on both axially oriented sides of the inner part 111*b* of the disk 111 are protrusions 112, 113, which are fixedly connected to the inner part 111*a* of the disk of the bearing 11. The disk 111 of the thrust bearing 11, is mounted on the shaft 13 in such a manner that its first side on which the protrusion 112 is located, is recessed by the protrusion 112 into the shaft 13, fixed by the bolt 18 and secured by fastening means, such as bolts or pins, which are fixedly mounted in the axial direction in the shaft 13 and in the disk 111.

The impeller 5 is attached to the shaft 13 in such a manner that its side which is axially opposite to the side of the impeller 5 on which the blades 51 are arranged, is attached to the second side of the disk 111, which is axially opposite to the first side of the disk 111 in the axis 131 of the shaft 13. The impeller 5 is mounted on the protrusion 113, attached to the disk 111 by a bolt 18 and secured by fastening means, such as screws or pins, which are fixed in the axial direction in the impeller 5 and in the disk 111. The impeller 5 attached to the disk 111 adjoins the disk 111 in such a manner that it touches only the protrusion 113, so that a radial groove 17 is formed between the inner part 111b of the disk 111 and the impeller 5. Due to this arrangement of the fixed mounting of the impeller 5 on the shaft 13, the contact area between the impeller 5 of the shaft 13 and the disk 111 is reduced and the heat transfer between the cold and hot parts of the turbo compressor assembly is reduced. In addition, the groove 17 is cooled by the stream S3 of the leaking working medium.

The flow of the working medium of a cooling machine according to the present invention of a turbo compressor of a cooling machine, during machine operation, is schematically shown in FIG. 2, indicating the main stream S1 of the working medium, the streams S2, S3 and S4 of the working medium leaks and the stream S5 of the cooling medium of the body 21 of the electric motor III. The gas stream S1 having a pressure of 1 Bar to 5 Bar is fed through the inlet opening of the confuser 4 into the single-wheel radial compressor I, where it is compressed in the diffuser 2 at a compression ratio of 1.6 to 2.2. The main stream S1 of the compressed working gas having a pressure of 1.6 Bar to 11 Bar and a temperature up to 150° C. is further fed to a known unillustrated exchanger and from there is fed to the inlet spiral chamber 6 of the turboexpander II, from where the stream S1 is fed to the impeller 5 of the single-stage radial expansion turbine, in which it expands in an expansion ratio of 1.5 to 2.1 and at the same time is cooled to the set temperature of up to −150° C. The cooled stream S1 of the working gas is fed from the diffuser 7 to an unillustrated known exchanger and/or the cooling chamber, where it is heated and from there it is brought back to the confuser 4 at the inlet of the compressor I. The secondary stream S2 of the compressed working gas having a pressure which is lower than the pressure of gas in the diffuser 2 and during machine operation acquires pressure values of 1.5 Bar to 10 Bar, is fed from the compressor I via the first radial dynamic gas bearing 101 to the piston 15, whose working surface which adjoins the surface 162 is subjected to an axial force which is oriented opposite to the axial component of the force exerted on the shaft 13 by the impeller 1 of the compressor I, the action of axial forces in the opposite direction is balanced and the thrust bearing 11 is relieved. The stream S2 is then fed from the piston 15 through the shaft seal 14 to a collecting channel 22 of extraction of the working medium leaks, from which it is led in the stream S4 together with the working gas leaks, which are fed by the stream S3 from the turboexpander II via the thrust bearing 11, the radial bearing 102 and the rotor 8 of the electric motor III, through the ducts 23 into the inlet mouth of the confuser 4 of the compressor I. The stream S3, by which the leaks of a relatively cool working medium from the turboexpander II are led, cools the shaft 13 and the rotor 8 of the electric motor II. The stator 9 of the electric motor II mounted in the body 21, 211 is cooled by the cooling medium, such as fluid or gas, in such a manner that the cooling medium is fed by the stream S5 from an unillustrated known source to the outer cooling channel 122, through which it is fed to the inner channel 121, the body 21 with the stator 9 is cooled, and the stream S5 is fed to the outer channel 122, from which it is fed to an unillustrated known source of the cooling medium. The stream S5 of the cooling medium of the stator 9 of the electric motor III is not in fluid commu-nication with any of the streams S1, S2, S3, S4 of the working medium of the cooling machine.

LIST OF REFERENCES

I compressor
II turboexpander
III electric motor
1 blade compressor impeller
2 compressor diffuser
3 spiral chamber of the compressor
4 confuser at the inlet of the compressor
5 blade impeller of the turbine of the turboexpander
51 blade of the blade impeller of the turbine of the turboexpander
6 spiral chamber of the turboexpander
7 diffuser at the outlet of the turboexpander
8 rotor of the electric motor with permanent magnets
9 stator of the electric motor
10 radial dynamic gas bearings
101 first radial dynamic gas bearing
102 second radial dynamic gas bearing
11 thrust dynamic gas bearing
111 disk of the thrust dynamic gas bearing
111a outer part of the disk of the thrust dynamic gas bearing
111b inner part of the disk of the thrust dynamic gas bearing
112 first protrusion of the disk of the thrust dynamic gas bearing
113 second protrusion of the disk of the thrust dynamic gas bearing
12 channel for the cooling medium of the electric motor
121 inner channel for the cooling medium of the electric motor
122 outer channel for the cooling medium of the electric motor
13 shaft
131 shaft axis
14 shaft seal
15 piston for balancing axial force
16 carrier of the radial bearing
161 first inner cylindrical surface of the radial bearing carrier
162 third inner surface of the radial bearing carrier
163 second cylindrical surface of the radial bearing carrier
17 radial groove between the disk of the thrust bearing and the blade impeller of the turbine of the turboexpander
18 screw for mounting the blade impeller of the turbine of the turboexpander
19 body of the compressor
20 body of the turboexpander
21 body of the electric motor
211 inner body of the electric motor
212 outer body of the electric motor
22 common leakage suction channel of the working medium
23 common leakage extraction duct of the working medium
S1 main stream of the working gas
S2 secondary stream of the working gas from the compressor
S3 secondary stream of the working gas from the turboexpander S4 common stream of the working gas leakage from the compressor and the turboexpander S5 stream of the cooling medium of the electric motor body

The invention claimed is:

1. A turbo compressor assembly of a cooling machine, comprising:
   a compressor comprising an impeller;
   an electric motor comprising a rotor;
   a turboexpander comprising a turbine with an impeller;
   the compressor, electric motor, and turboexpander all arranged in a common housing, the common housing comprising a body of the compressor, a body of the electric motor, and a body of the turboexpander;
   a shaft mounted in the common housing;
   the compressor impeller, the turbine impeller, and the electric motor rotor all fixedly mounted on the shaft;
   the compressor impeller and the turbine impeller placed at opposite ends of the common shaft, and the electric motor rotor being placed between the compressor impeller and the turbine impeller;
   the shaft mounted in the common housing between the compressor impeller and the electric motor rotor with a first radial dynamic gas bearing, and mounted between the turbine impeller and the electric motor rotor with a second radial dynamic gas bearing;
   the shaft mounted between the second radial dynamic gas bearing and the turbine impeller with a thrust dynamic gas bearing, wherein a supply stream of working gas from the turbo compressor assembly supplied to the first radial bearing is formed between an inner wall of the compressor body and the shaft, and a supply stream of working gas from the turbo expander supplied to the second radial bearing and to the thrust bearing is formed between an inner wall of the turboexpander body and the shaft;
   the first radial dynamic gas bearing sealed towards the electric motor rotor by a shaft seal; and
   a surface in a shape of an annulus formed on the shaft between the first radial bearing and the shaft seal, the annulus perpendicular to an axis of the shaft and functioning as a piston for balancing an axial force acting on the shaft.

2. The turbo compressor assembly according to claim 1, wherein the shaft seal comprises a false labyrinth formed by at least five teeth that seal against a substantially flat cylindrical surface.

3. The turbo compressor assembly according to claim 2, the first radial dynamic gas bearing is mounted in a carrier, the carrier comprising a first inner cylindrical surface that is substantially parallel to an axis of the shaft, a second inner cylindrical surface that is substantially parallel to the axis of the shaft and is part of the shaft seal, and a third inner surface in a shape of an annulus that is substantially perpendicular to the axis of the shaft and is located between the first cylindrical surface and the second cylindrical surface, wherein a diameter of a cylindrical cavity bounded by the second cylindrical surface is larger than a diameter of a cylindrical cavity bounded by the first cylindrical surface.

4. The turbo compressor assembly according to claim 3, wherein the carrier is formed of a single piece of material and comprises a first part surrounded by the compressor body and a second part surrounded by an inner body of the electric motor.

5. The turbo compressor assembly according to claim 1, wherein the thrust dynamic gas bearing comprises a disk mounted on the shaft, the disk having a first side of the disk oriented towards the rotor of the electric motor and a second side oriented towards the turbine impeller, and comprising a radial groove formed in the shaft between the disk and the turbine impeller.

6. The turbo compressor assembly according to claim 1, wherein the electric motor body comprises an inner body that accommodates a stator of the electric motor, and an outer body that accommodates the inner body, wherein a common cooling channel is formed by the inner and outer bodies for flow of a cooling medium to cool the stator.

* * * * *